United States Patent [19]
Choisnet

[11] Patent Number: 5,317,915
[45] Date of Patent: Jun. 7, 1994

[54] APPARATUS FOR THE DETECTION OF THE ICING-UP OF THE BLADES OF AN AIRCRAFT ROTOR

[75] Inventor: Joel Choisnet, La Frette S/Seine, France

[73] Assignee: Sextant Avionique, France

[21] Appl. No.: 947,500

[22] Filed: Sep. 18, 1992

[30] Foreign Application Priority Data

Sep. 18, 1991 [FR] France .................. 91 11504

[51] Int. Cl.⁵ .............................................. G01C 21/00
[52] U.S. Cl. ............................ 73/178 H; 73/862.195
[58] Field of Search ..................... 73/862.195, 862.29, 73/862.193, 178 H; 364/424.06, 551.01; 340/962, 946, 580; 244/17.11

[56] References Cited

U.S. PATENT DOCUMENTS 4,573,351 3/1986 Weiner ........................ 73/178 H
4,780,838 10/1988 Adelson ........................ 364/567

FOREIGN PATENT DOCUMENTS 2174072 10/1973 France .
2046690 11/1980 United Kingdom .

Primary Examiner—Richard E. Chilcot, Jr.
Assistant Examiner—Joseph L. Felber
Attorney, Agent, or Firm—Rosenman & Colin

[57] ABSTRACT

An apparatus for the detection of the icing-up of an aircraft rotor. The apparatus has a sensor (10) for the tractive force and a sensor (11) for torque; for measuring respectively the axial force and the torque exerted on the shaft of the rotor. A device (12) calculates the ratio between these two quantities. A determination is also made, as a function of the flying conditions, of what should be the nominal value of this ratio in the absence of icing-up. Finally a device (12) compares the calculated ratio with the nominal ratio.

7 Claims, 2 Drawing Sheets

APPARATUS FOR THE DETECTION OF THE ICING-UP OF THE BLADES OF AN AIRCRAFT ROTOR

BACKGROUND OF THE INVENTION

1. Field of the Invention

The present invention relates to an apparatus for detecting the icing-up of the blades of an aircraft rotor.

The icing-up of the blades of a rotor of an aircraft such as a helicopter is a serious phenomenon, able to destabilise it causing loss of control. It is thus important to detect the icing-up sufficiently early in order to be able to put the de-icing apparatus into operation.

2. Description of the Related Art

The detection of the icing-up of the blades may be effected by means of specific sensors installed directly on these blades. However, this direct method has the drawback that the sensors are exposed to a severe environment and that it is difficult to transmit the information to the fixed parts of the system.

The document GB-A-2 046 690 has also proposed using the torque transmitted to the rotor, in order to detect the icing-up of the blades. However, this method necessitates quite a high number of calculations, even in cases where the accuracy required is relatively low.

SUMMARY OF THE INVENTION

The present invention intends to obviate these drawbacks.

To this end, the invention relates to an apparatus for the detection of the icing-up of the blades of an aircraft rotor, having a sensor for the tractive force and a torque sensor for measuring respectively the axial force F and the torque M exerted on the shaft of the rotor, means for calculating the ratio between these two (i.e. the axial force and the torque) quantities, means for determining, as a function of the flying conditions, the nominal value of this ratio in the absence of icing-up and means for comparing the calculated ratio with the nominal ratio.

The fact of using as a criterion, the ratio between the axial force and the torque exerted on the drive shaft, generally makes it possible, as will be seen hereafter, to simplify the calculations to a great extent whilst preserving good accuracy.

More particularly, in certain cases one could compare the flying conditions with the single pitch of the blades.

The nominal value of the aforesaid ratio may be either calculated in real time as a function of the flying conditions, or previously memorised.

In one particular embodiment of the invention, the sensors are arranged in order to measure the forces exerted in a torsion tube disposed between the drive shaft and the shaft of the rotor.

These sensors may in particular be housed in an annular space comprised between the torsion tube and a central tube.

Rotary transformers are advantageously provided for the transmission of the torque and tractive force signals, which transformers are constituted by opposite windings mounted on the torsion tube and on a stator disposed around said tube.

BRIEF DESCRIPTION OF THE DRAWINGS

A particular embodiment of the invention will now be described as a non-limiting example with reference to the accompanying drawings, in which.

DESCRIPTION IN THE PREFERRED EMBODIMENTS

Figure 1:
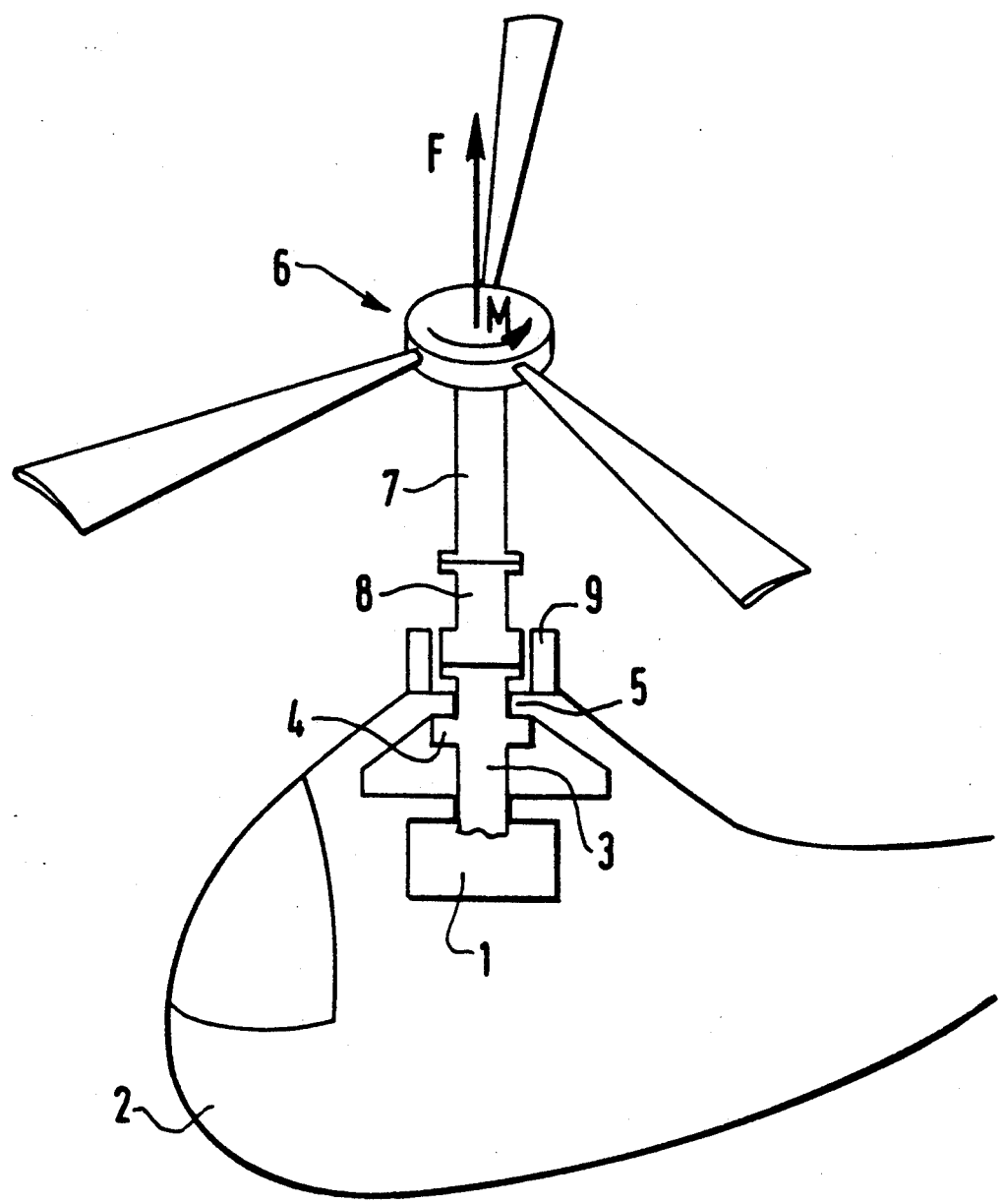
FIG. 1 is a diagrammatic representation of a helicopter comprising an apparatus according to the invention.

A helicopter shown FIG. 1 includes an engine 1 mounted in its cell 2 and provided with an output shaft 3. Naturally a speed-reducer (not shown) is provided between the engine and the output shaft.

The output shaft 3 forms an annular abutment 4 cooperating with an abutment 5, integral with the cell 2, in order to absorb the axial force exerted by the rotor 6.

A shaft 7 of this rotor is connected to the drive shaft 3 by the intermediary of a rotor sensor 8 which will be described in more detail hereafter. A stator sensor 9 is mounted integrally with the cell 2 around the rotor 8.

Figure 2:
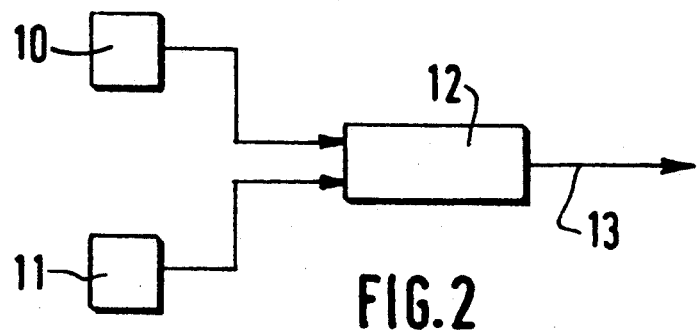
FIG. 2 is a block diagram of this apparatus.

As shown in FIG. 2, the sensor is in fact divided into an axial force sensor 10 measuring the force exerted longitudinally in the shaft 7 of the rotor 6 and a torque sensor 11 measuring the torque exerted on the shaft 7.

The measurements from the sensors 10 and 11 are sent to a calculator 12 which determines whether or not icing-up exists and whereof the output 13 may be connected for example to an alarm in the pilot's cockpit, or directly to anti-icing up apparatus.

Figure 3:
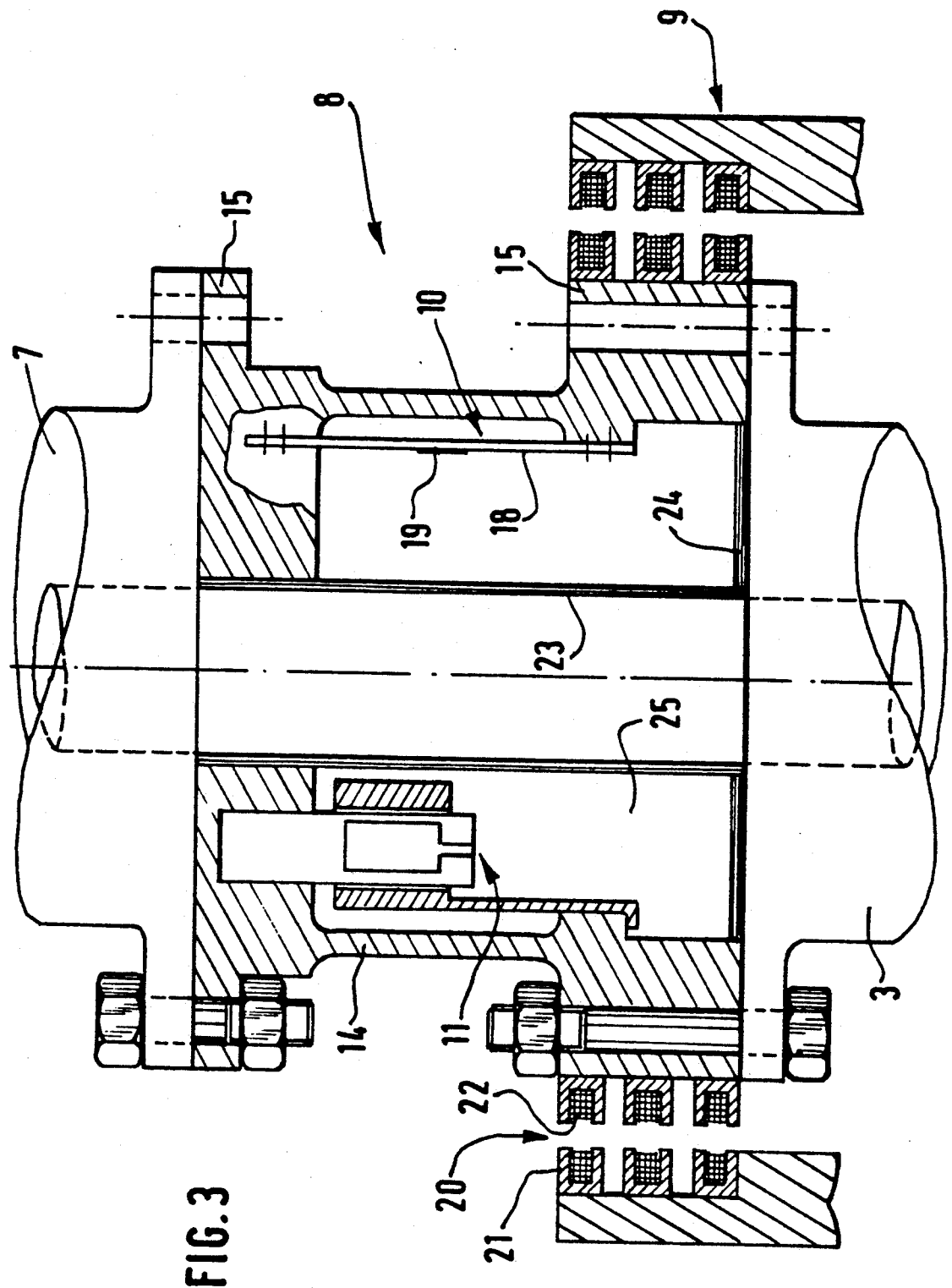
FIG. 3 is an axial sectional view of the sensors of this apparatus.

Referring now to FIG. 3, it can be seen that the rotor 8 of the sensor has a body 14 constituted essentially by a torsion tube whereof the longitudinal ends form flanges 15 for its attachment to the lower part of the rotor shaft 7, and to the upper part of the drive shaft 3.

The forces are thus transmitted between the rotor shaft 7 and the drive shaft 3 through the intermediary of the torsion tube. Under the action of the torque to be measured M, the tube undergoes a torsional deformation, and under the action of the tractive forces to be measured F, the tube undergoes an elongation.

Disposed inside the torsion tube 14 is the capacitive sensor 11 for microdisplacements facilitating measurement of the torsional deformations. A sensor suitable for this measurement is described for example in U.S. Pat. No. 5,010,775 and therefore will not be described again here in detail.

Knowing the geometric and mechanical characteristics of the torsion tube 14, the torque transmitted is immediately deduced from the torsional deformations.

The elongation sensor 10 is also disposed inside the torsion tube 14.

This sensor is essentially constituted by a resilient rod 18 rigidly fixed at its two longitudinal ends to the two flanges 15 of the torsion tube, in order to undergo the same elongation as the latter. The stresses thus generated in the rod 18 are measured by means of a strain gauge bridge 19 placed on the rod. The gauges may in particular be made as a thin metal layer owing to the great fidelity and low deviations of this technology. A well-advised assembly of the gauges 19 makes it possible to obtain a measurement of the elongation independent of the torsion.

FIG. 3 also shows three rotary transformers 20, each formed by two magnetic circuits 21 and two windings 22, one of the magnetic circuits and one of the windings being mounted on the body of the stator 9, opposite the other magnetic circuit and the other winding mounted on the rotor 8.

one of the transformers allows the transmission of an electrical supply to the rotor 8 of the sensor, the second allows the transmission of the measurement information of the torque and the third allows the transmission of the measurement information of the tractive force.

It can also be seen from FIG. 3 that the measuring apparatus does not use the central space adjacent to the axis of the rotor. It is thus possible to leave this space free over the entire length of the sensor.

A central tube 23 and a cover 24 make it possible to isolate the measuring elements from the outside environment.

This arrangement is particularly advantageous in helicopters having a hollow rotor shaft, the central part being used for the transmission of supplementary commands to the rotor, for example commands of the pitch of the blades. The apparatus of the invention thus allows the transmission of these commands.

Finally, since the annular space 25 still remains free between the torsion tube 14 and the central tube 23, it may be used for the installation of the electrical power supply and processing circuits.

It is known that the aerodynamic forces F and M generated on the rotor shaft 7 by the rotation of the blades, are essentially a function of the following parameters:

the geometry of the blades and in particular their profile, the pitch of the blades p and their speed of rotation $\Omega$.
the volumetric mass of the air $\rho$, and
the speed of the helicopter with respect to the air v.

In the absence of icing-up of the blades, the ratio M/F is a function of these parameters, namely:

$$M/F = f(p, \Omega, \rho, v)$$

which one can calculate or determine experimentally and memorise.

The formation of a layer of ice on the blades rapidly degrades their aerodynamic profile and all other things being equal results in an increase of the resistant torque due to additional drag of the blades and in a reduction of the lift, i.e. finally in an increase of the ratio M/F.

The comparison between the values of the ratio M/F obtained:

on the one hand, from the calculation of the function $f(p, \Omega, \rho, v)$ on the other hand, from the values of M and F measured by the force sensor described previously, makes it possible to determine whether or not there is icing-up of the blades.

The calculator 12 thus receives at its input, on the one hand the values of F and M measured as described previously and, on the other hand, the values of p, $\Omega$, $\rho$ and v measured by specific sensors.

In its memories, the calculator 12 has a mathematical model enabling it to calculate the value of the function $f(p, \Omega, \rho, v)$ and compares this value with that of the ratio M/F which it also calculates.

The deviation obtained, beyond a certain threshold of uncertainty connected with the errors of measurement of the various sensors and with the accuracy of the mathematical model for the calculation of f makes it possible to come to the conclusion of icing-up of the blades and to indicate this to the pilot.

The amplitude of the deviation gives an image of the severity of the icing-up.

It is possible to simplify this model if one notes that the aerodynamic forces on a profile are proportional to the square of its speed in the air (thus to $\Omega^2$, the speed vector v intervening solely as a corrective term) and to the volumetric mass of the air $\rho$. Consequently, in the absence of icing-up, the function $f(p, \Omega, \rho, v)$ is to a large extent independent of the parameters $\Omega$ and $\rho$.

The speed vector v of the helicopter with respect to the air also intervenes solely as a corrective term on the angle of incidence of each blade member, a parameter which is represented overall by the pitch of the blades p. One could thus frequently return with sufficient accuracy to a function $f(p)$ causing only the pitch of the blades p to intervene.

Naturally, the invention is not limited to the embodiment described above.

Thus measuring the axial force could be carried out not on the shaft of the rotor, but at the level of the abutment 5.

Similarly, the measurement of the torque could be effected at the output or even inside the engine, to the extent that the intermediate mechanical members which lead up to the shaft of the rotor (speed reducer, bearing, power take-offs . . . ) do not introduce considerable errors.

Similarly, the calculator 12 could not carry out the calculation of the function f, but simply read from the memory the values of this function previously memorised as a function of the various parameters.

I claim:

1. Apparatus for the detection of the icing-up of the blades of an aircraft rotor mounted on a drive shaft, said apparatus comprising a force sensor and a torque sensor for measuring respectively the axial force and the torque exerted on said shaft, means for calculating the ratio between said axial force and said torque, means for determining the nominal value of said ratio as a function of the flying conditions, and means for comparing the calculated ratio with the nominal ratio.

2. Apparatus according to claim 1, comprising means for calculating the nominal value of the ratio as a function of the flying conditions.

3. Apparatus according to claim 1, comprising means for memorising the nominal value of the ratio as a function of the flying conditions.

4. Apparatus according to claim 1, in which the flying conditions are determined by the pitch of the blades.

5. Apparatus according to claim 1, in which said sensors are arranged in order to measure the forces exerted in a torsion tube disposed between the drive shaft and the shaft of the rotor.

6. Apparatus according to claim 5, in which said sensors are housed in an annular space comprised between the torsion tube and a central tube.

7. Apparatus according to claim 5, comprising rotary transformers for the transmission of the torque and axial force signals, constituted by opposite windings mounted on the torsion tube and on a stator disposed around said tube.

* * * * *